Dec. 1, 1936.   L. A. GRAHAM   2,062,901
VARIABLE SPEED TRANSMISSION
Filed April 15, 1936   2 Sheets-Sheet 1

INVENTOR
Louis A. Graham
BY
John W. Michael
ATTORNEYS

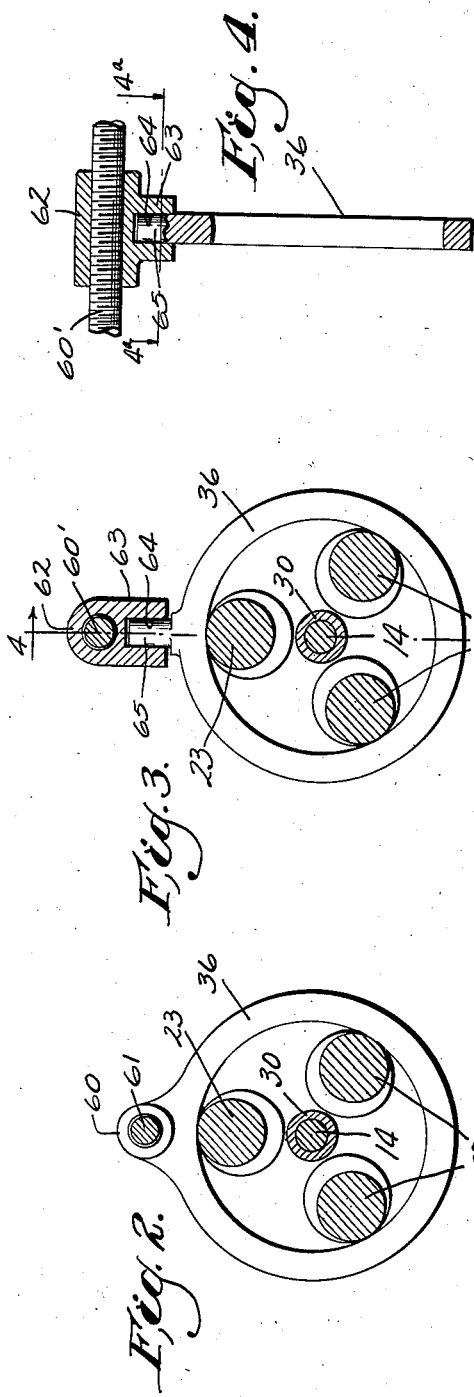
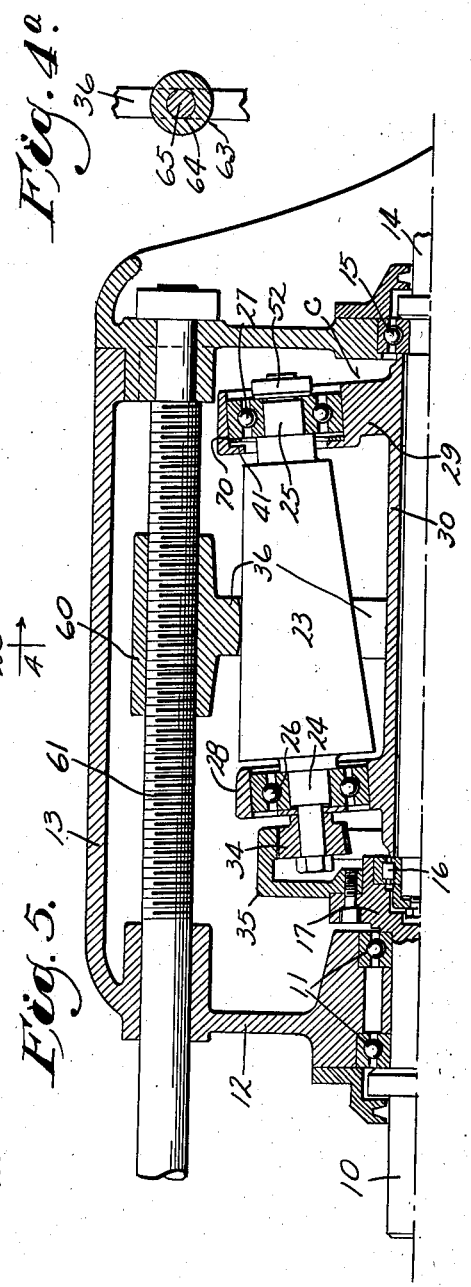

Patented Dec. 1, 1936

2,062,901

UNITED STATES PATENT OFFICE 2,062,901

VARIABLE SPEED TRANSMISSION

Louis A. Graham, Milwaukee, Wis.

Application April 15, 1936, Serial No. 74,403

4 Claims. (Cl. 74—281)

This invention relates to an improvement in variable speed transmissions of the type including a plurality of longitudinally tapered planets correspondingly inclined with respect to a central axis and controlled in their planetary action by an encircling traction or hold-back ring which is adjustable longitudinally of the planets to vary the speed.

In a transmission of this type it is important to provide means for developing contact or working pressure between the planet rollers and the ring.

One of the objects of the present invention is to provide a simple, effective and reliable structural organization for setting up the requisite contact pressure. In particular, this is accomplished by mounting the planet rollers on their rotary carrier so that they are capable of individual or independent movement in such direction that at least a component of such movement will be transverse to the axis of rotation of the carrier and hence toward and away from the ring. Combined with each roller and the carrier is a separate spring which is effective to apply to the roller the force necessary to make it move into pressure contact with the ring.

Another object is to simplify the mounting and control of the roller encircled ring. More specifically, with the present invention it is necessary to use only a single ring which is so advantageously combined with its operating means that while floatably mounted it is readily and easily controlled.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 2 is a view in transverse section taken on line 2—2 of Figure 1 and looking in the direction of the arrows;

Figure 3 is a view similar to Figure 2 but showing another construction whereby the ring is interconnected with its operating element;

Figure 4 is a view in section taken on line 4—4 of Figure 3;

Figure 4a is a view taken on line 4a—4a of Figure 4; and

Figure 5 is a fragmentary view similar to Figure 1 showing a modified transmission construction.

Figure 1:
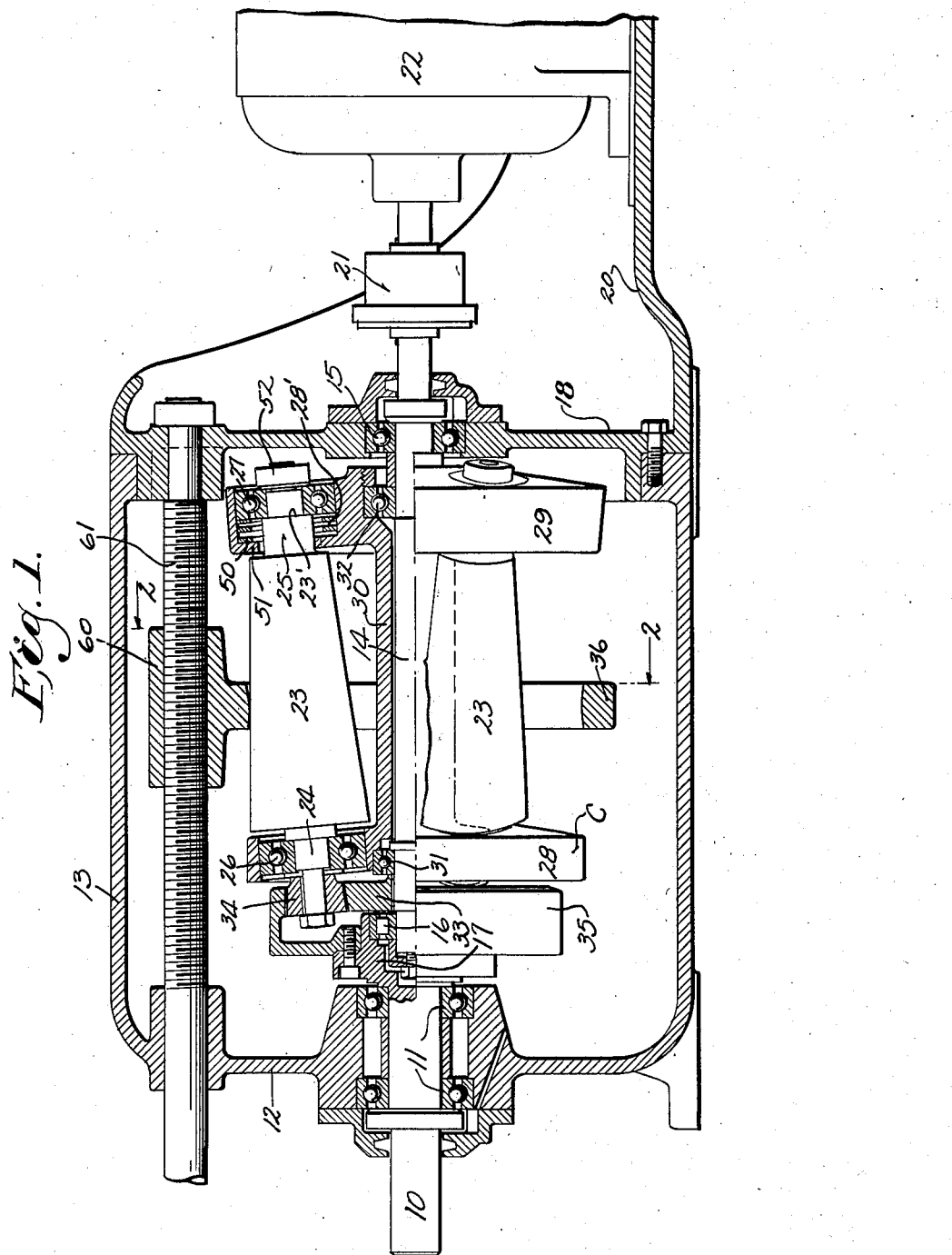
Figure 1 is a view partly in longitudinal vertical section and partly in side elevation showing a variable speed transmission embodying the present invention.

In the drawings, the variable speed transmission shown in Figures 1 and 5 are, in the general features of their construction and except in the particulars hereinafter pointed out and described, of the same type as that forming the subject matter of my application filed November 28, 1934, Serial No. 755,081, and my application filed May 9, 1935, Serial No. 20,549, to which reference is made for a detailed disclosure of the general structure referred to. It is to be understood, however, that the features of novelty characteristic of the present invention are not restricted in their applicability to the particular structures shown in said applications and that they have been referred to merely for the sake of illustration.

For the purposes of the present invention, it is sufficient to observe that in both Figures 1 and 5 the transmission comprises a driven shaft 10 and an alined drive shaft 14. The driven shaft 10 is supported for rotation in spaced bearings 11 carried by an end wall 12 of a housing 13. A bearing 15 provided in a detachable end wall 18 of the housing and a bearing 16 mounted in a hollow head 17 formed at the inner end of the shaft 10 support the shaft 14 for rotation.

As shown in Figure 1, an electric motor 22 mounted on a bracket 20 acts through a flexible coupling 21 to drive the shaft 14.

In both Figures 1 and 5 a rotary carrier designated generally at C is provided, and, as illustrated, may comprise spaced end discs 28 and 29 and a connecting tubular structure 30.

As shown in the drawings, the rotary carrier may consist of a one-piece casting although it may be made up of separate parts if desired. However, by making the rotary carrier a one-piece casting the cost of manufacturing it is greatly reduced, the necessity of difficult machining operations is avoided and precision in alinement and other desirable structural characteristics is had.

In the construction shown in Figure 1, the rotary carrier is supported for rotation on the shaft 14 by means of interposed bearings 31 and 32. In the transmission shown in Figure 5 the carrier C is fixed or keyed to the shaft 14.

In both forms of the invention a plurality of longitudinally tapered planet rollers 23 are supported on the carrier C for bodily revolution therewith and also for rotation about their own axes. For this purpose, each roller 23 is provided adjacent its ends with trunnions 24 and 25 journaled in bearings 26 and 27 slidably mounted in openings provided therefor in the end discs 28 and 29.

The several rollers 23 are of uniform size and shape and are arranged with their axes uniformly inclined relative to the axis of the shaft 14 at an angle equal to the angle of their taper and with their smaller ends outermost so that the outermost elements of their surfaces are parallel to the axis of the shaft 14.

In Figure 1 a sun gear 33 fixed to the shaft 14 meshes with planet pinions 34 fixed to extensions of the trunnions 24. An internal gear 35 surrounds and meshes with the planet pinions 34 and has its hub suitably secured to the head 17 of the driven shaft 10. In Figure 5 the sun gear 33 is omitted but the planet pinions 34 and driven gear 35 are employed.

The planetary action of the rollers 23 and planet pinions 34 is controlled by means of a non-rotary contact or traction ring 36 preferably mounted and controlled in a manner to be hereinafter more fully described.

Each roller assembly including a roller 23, its bearings 26 and 27 and its planet pinions 34 is longitudinally movable in the direction of its inclined axis and is continuously urged outwardly along that axis to maintain contact pressure between each roller 23 and the traction ring 36. The capacity for this movement is imparted to each roller assembly by providing sufficient backlash in the ring gear 35 and by the sliding fit of the bearings 26 and 27 in their respective openings in the end discs of the carrier.

For the purpose of urging the planet rollers 23 outwardly along their axes and thereby developing the proper contact pressures between the rollers and their encircling ring, an individual spring 50 is provided for each of the rollers in the transmission shown in Figure 1. In the construction illustrated in Figure 1 a simple helical spring is combined with each planet roller and has one end abutting the outer race of its bearing assembly 27 and its other end abutting a shoulder 51 formed at the inner end of the opening 28' which receives its bearing assembly 28. With this construction it is evident that as the nut 52 of each planet assembly is tightened up the spring 50 is compressed and at the same time the roller of the planet assembly drawn up its axis under the spring pressure. Any desired amount of spring pressure may be obtained by changing the adjustment of the nut up to the point where the inner race of the bearing assembly 28 abuts against the shoulder 23' of the planet member. In the construction shown in Figure 1 a bearing assembly 27 is illustrated which is designed to carry both the radial and the thrust loads. The nut 52 may be locked in its various adjustments in any suitable way.

The primary purpose of the ring 34 is that of a hold-back or traction element against which the planet rollers work and it also must be adjusted longitudinally of the rollers to control their motion or in other words to vary the speed and direction of rotation. It is also essential that the ring 34 be held against rotation. This may be accomplished in a number of ways. As illustrated in Figures 1 and 5, the ring 34 is provided with an internally threaded enlargement 60, the internal threads of which are meshed with the threads of a screw 61 supported for rotation in the housing or frame but held against longitudinal movement, and, of course, provided with some means to facilitate its actuation. A variety of means may be employed for adjusting the ring longitudinally and holding it against rotation and the character of such means may perhaps be best understood by reference to my application for variable speed transmissions, filed November 9, 1935, Serial No. 48,979. In some instances it is not necessary to have the ring floatably mounted but usually this is desirable and it may be conveniently accomplished in a number of ways. For example, in the structure shown in Figures 1 and 5, this rotation of the ring or its capacity to adapt itself to the action of the rollers and to compensate for inaccuracies that find their way into constructions of this character may be had by simply making the threads of the adjusting screw 61 and the intermeshed threads of the enlargement or extension 60 of the ring a loose or sloppy fit.

The construction shown in Figures 3 and 4 illustrates another way of more thoroughly accomplishing this desired floatation. As there illustrated the adjusting screw is designated at 60' and is threadedly interconnected with a nut 62, an extension 63 of which is formed with a socket 64 circular in cross section. Loosely interfitted with the socket 64 is a pin or stud 65 which may be formed integral with the ring 34 and which is so dimensioned and proportioned that it may shift axially in the socket 64, may turn therein about its own axis but is constrained to partake of the axial or longitudinal movement of the nut 62.

In both embodiments of the invention, the rollers 23 are shiftable outwardly along their axes and consequently transversely toward and away from the ring 34 by virtue of the manner in which the bearings 26 and 27 are mounted in the end plates of the carrier.

In both embodiments the planet rollers 23 are relatively large and heavy so that during the operation of the transmission centrifugal force will urge them outwardly along their axes to develop or augment the working pressure between the rollers and the ring. In some types of structures and particularly small units, centrifugal force alone may be relied upon, but in many other instances, it is desirable to supplement the action of such force by the application of a predetermined or definite amount of force which, while available in a number of ways, is most conveniently had by the use of a spring.

In the construction shown in Figure 5, a helical spring of several convolutions is not employed, but, if desired, a spring washer 70 may be interposed between the outer race of the bearing 27 and the adjacent shoulder 41. Such a construction is especially adapted for advantageous embodiment in small units and makes possible a higher relative speed of the out-put or driven shaft and thus reduces the torque requirements in the transmission with consequent reduction in its size.

While I have shown and described several constructions in which my invention may be advantageously embodied, it is to be understood that they have been selected merely for the purpose of illustration or example and that various changes in the size, shape and arrangement of the parts may be made without departing from the spirit of the invention or the scope of the subjoined claims.

The invention claimed is:

1. A variable speed transmission comprising a rotary carrier, a plurality of conical planetary rollers supported for rotation with and with respect to the carrier and inclined with respect to the axis of rotation thereof, a single, non-rotatable traction ring encircling the rollers and having a single pin-like projection, an actuating member to move the ring over substantially the length of the rollers to control their motion and loosely connected to said ring solely through said pin so as to permit translation of the ring in the direction of the axis of the pin, and means supporting said actuating member for oscillation about an axis external to the ring and parallel to the axis of the carrier.

2. A variable speed transmission comprising a rotary carrier, a plurality of conical planetary rollers supported for rotation with and with respect to the carrier and inclined with respect to the axis of rotation thereof, a single, non-rotatable traction ring encircling the rollers and movable longitudinally thereof, an actuating member for moving the ring longitudinally of the rollers to control their motion, a single pin and socket connection between the ring and the actuating member providing for translation of the ring along an axis substantially perpendicular to the axis of rotation of the carrier, and means providing for oscillation of said ring about an axis external to the ring and parallel to the axis of the carrier.

3. A variable speed transmission comprising a rotary carrier, a plurality of conical planetary rollers supported for rotation with and with respect to the carrier and inclined with respect to the axis of rotation thereof, a single traction ring encircling the rollers and movable longitudinally thereof to control their motion, an actuating member for moving said ring longitudinally of the rollers, means supporting said actuating member for oscillation about an axis external to the ring and parallel to the axis of the carrier, and a single pin and socket connection between the ring and the actuating member providing for translation of the ring along an axis substantially perpendicular to said axes.

4. A variable speed transmission comprising a rotary carrier, a plurality of conical planetary rollers supported for rotation with and with respect to the carrier and inclined with respect to the axis of rotation thereof, a single one piece traction ring encircling the rollers and movable longitudinally thereof to control their motion, said ring having a single external projection rigid therewith and means coacting with said projection to mount the ring for oscillation about an axis parallel to the axis of the carrier and for translation along an axis substantially perpendicular to the axis of the carrier.

LOUIS A. GRAHAM.